United States Patent
John et al.

(10) Patent No.: US 10,616,050 B2
(45) Date of Patent: Apr. 7, 2020

(54) SOFTWARE DEFINED STORAGE (SDS) SYSTEM WITH NETWORK TIERING

(71) Applicant: VCE IP Holding Company LLC, Richardson, TX (US)

(72) Inventors: Nitin John, Sudbury, MA (US); Ryan Andersen, Belmont, MA (US)

(73) Assignee: VCE IP Holding Company LLC, Richardson, TX (US)

( * ) Notice: Subject to any disclaimer, the term of this patent is extended or adjusted under 35 U.S.C. 154(b) by 245 days.

(21) Appl. No.: 15/588,111

(22) Filed: May 5, 2017

(65) Prior Publication Data

US 2018/0324038 A1 Nov. 8, 2018

(51) Int. Cl.
*H04L 12/24* (2006.01)
*H04L 12/861* (2013.01)
*H04L 29/08* (2006.01)
*H04L 12/931* (2013.01)

(52) U.S. Cl.
CPC ........ *H04L 41/0803* (2013.01); *H04L 49/205* (2013.01); *H04L 49/9005* (2013.01); *H04L 67/1097* (2013.01); *H04L 67/322* (2013.01)

(58) Field of Classification Search
CPC ............. G06F 17/5022; G06F 17/5009; H04L 41/0803; H04L 49/205; H04L 67/322; H04L 67/1097
See application file for complete search history.

(56) References Cited

U.S. PATENT DOCUMENTS

| | | |
|---|---|---|
| 9,116,914 B1 * | 8/2015 | Muthirisavenugopal ................... G06F 16/185 |
| 9,569,569 B1 * | 2/2017 | Colon ................. G06F 17/5022 |
| 2013/0297869 A1 * | 11/2013 | Mills ..................... G06F 3/0674 711/112 |

* cited by examiner

*Primary Examiner* — Kyung H Shin
(74) *Attorney, Agent, or Firm* — Polsinelli PC

(57) ABSTRACT

Aspects of the present disclosure involve systems and methods for a tiered scheme of quality of service settings for ports of a network switch based at least on a performance metric of a storage pool of a software defined storage (SDS) appliance. In one particular embodiment, a network switch associated with one or more storage appliances may be configured to apply the networking tiered scheme to the ports of the network switch. The tiered scheme may be associated with a storage tier assigned or associated with a storage pool of the SDS system. Thus, a networking tier may be provided to one or more ports or networking components of the network if those ports or components are associated with the storage tier. The particular networking tier associated with a port or component may determine one or more quality of service settings applied to the port or component.

20 Claims, 8 Drawing Sheets

NETWORK TIER TABLE

| POLICY | BANDWIDTH | PRIORITY | QUEUE SIZE |
|--------|-----------|----------|------------|
| A | 50% | 3 | LARGE |
| B | 25% | 2 | MEDIUM |
| C | 15% | 1 | SMALL |

FIG. 4

SOFTWARE DEFINED STORAGE (SDS) SYSTEM WITH NETWORK TIERING

TECHNICAL FIELD

Aspects of the present disclosure relate to configuration of various computing components, among other functions, and more particularly to systems, components, and management of software defined storage (SDS) appliances.

BACKGROUND

As computers become more commonplace in today's society, there is an ever increasing need for the storage of very large amounts of data and the fast access of such stored data. Several types of large capacity storage appliances have thus been developed. Examples of a high-capacity data storage system involve physical tape drive systems, large capacity optical storage systems; read only memory (ROM) systems, random access memory (RAM) systems, flash memory systems, and the like. These storage devices may be grouped together physically (such as in large storage appliances) or virtually over a network (such as in a storage area network (SAN) appliances or network attached storage (NAS) appliances). In physically connected storage appliances, one or more compute devices or applications connect directly to the storage appliance to store and retrieve data. Virtual storage appliances are generally accessed remotely through a network to store and retrieve data utilized by executing applications. In any storage appliance, there are often trade-offs between performance speed, storing capacity, and speed of retrieval of the data that a compute device or user of the storage appliance must consider when selecting a particular storage appliance to utilize. In addition to performance and capacity trade-offs within an appliance, network connections, transmission speeds, and connectivity between an application and the storage device may also be considered when selecting a storage appliance for use during execution of the application.

It is with these and other issues in mind that various aspects of the present disclosure were developed.

SUMMARY

Implementations of the present disclosure include a method for operating a software defined storage (SDS) system. The method may include the operations of associating a first communication packet received at a network switch with a first storage tier, the first storage tier comprising a first storage performance parameter and selecting a first network tier for the first communication packet, the selection of the first network tier based at least on the first storage tier associated with the first communication packet, the first network tier comprising a first threshold value for at least one quality of service (QoS) parameter for transmitting a packet through the network switch. The method may also include generating one or more configuration instructions for the network switch, the one or more configuration instructions applying the first threshold value for the at least one QoS parameter for the first communication packet and transmitting the first configuration instruction to the network switch.

Another implementation of the present disclosure includes a management tool of a software defined storage (SDS) system. The management tool includes at least one communication port for receiving a request for a storage capacity within the SDS from an executing application, a processing device, and a computer-readable medium connected to the processing device configured to store information. When the processing device executes the instructions it performs the operations of creating a plurality of network performance tiers for communication ports of a network device, each of the plurality of network performance tiers comprising a threshold value for at least one quality of service (QoS) parameter for the communication ports of the network device, determining a first subset of the communication ports of the network device are utilized by a first type of storage device of the SDS system to transmit data, and associating a first storage tier corresponding to the first type of storage device of the SDS system with the first subset of communication ports of the network device. Further, the processing device may perform the operations of applying a first network tier of the plurality of network performance tiers to the first subset of the communication ports of the network device based at least on the first storage tier associated with the first subset of communication ports, the first network tier comprising a first threshold value for the at least one QoS parameter for the communication ports of the network device and transmitting one or more configuration instructions for the network device, the one or more configuration instructions causing the network device to configure the first subset of communication ports with the first threshold value for the at least one QoS parameter.

Yet another implementation of the present disclosure includes a non-transitory computer-readable medium encoded with instructions, executable by a processing device, for operating a storage system. The instructions cause the processing device to associate one or more ports of a network switch with a first storage tier, the first storage tier corresponding to a first storage device type of an software defined storage (SDS) system utilizing the one or more ports of the network switch to transmit data, the instructions, when executed by a processing device, select a first network tier from a plurality of network performance tiers for the one or more ports of the network switch, the selection of the first network tier based at least on the first storage tier associated with the one or more ports, the first network tier comprising a first threshold value for at least one quality of service (QoS) parameter for a port of the network switch, and configure the one or more ports of the network switch through at least one configuration instruction for the network switch, the at least one configuration instruction applying the first threshold value for the at least one QoS parameter for the one or more ports of the network switch

BRIEF DESCRIPTION OF THE DRAWINGS

FIG. 4 is a table illustrating example network tier settings for a SDS appliance.

DETAILED DESCRIPTION

Aspects of the present disclosure involve a system and/or method for a tiered scheme of quality of service settings for ports of a network switch based at least on a performance metric of a storage pool of a software defined storage (SDS) appliance. In one particular embodiment, a network switch associated with one or more storage appliances may be configured to apply the networking tiered scheme to the ports of the network switch. The tiered scheme may be associated with a storage tier assigned or associated with a storage pool. For example, a first storage pool may be created with storage components of the SDS appliance and provided to executing applications with access to the first storage pool. The first storage pool may be associated with a first storage tier that provides certain storage performance metrics that are requested by the executing applications. Similarly, a second storage pool may also be created with storage components of the SDS appliance. The second storage pool may be associated with a second storage tier that provides certain storage performance metrics that are requested by the executing applications, with the first storage tier performance metrics being different than the second storage tier performance metrics. In this manner, the storage pools associated with the SDS appliance may be placed into a storage tier scheme for use by executing applications with access to the appliance.

However, the performance metrics of the SDS appliance may be negatively affected by a network through which the appliance is accessed. For example, although the first storage tier provides for certain performance metrics, such as data retrieval speed, those metrics may not be provided by the network through which the appliance is accessed by the application. Thus, the present application provides for a networking tier scheme that can be applied to one or more network elements that are associated with the storage tiers for the storage pools of the SDS appliance. Thus, a first networking tier may be provided to one or more ports or networking components of the network if those ports or components are associated with the first storage tier of the SDS appliance. A second networking tier may be provided to other ports or networking components of the network if those ports or components are associated with the second storage tier of the SDS appliance. The particular networking tier associated with a port or component may determine one or more quality of service (QoS) settings applied to the port or component. In this manner, ports of components of the network through which the SDS appliance is accessed by an executing application may be assigned or provided with a particular QoS setting that is associated with a storage pool that utilizes the port or component. The networking tier for the port or component may then correspond to the performance metric for the storage tier to avoid a loss of such metrics when accessing the SDS appliance.

Figure 1:
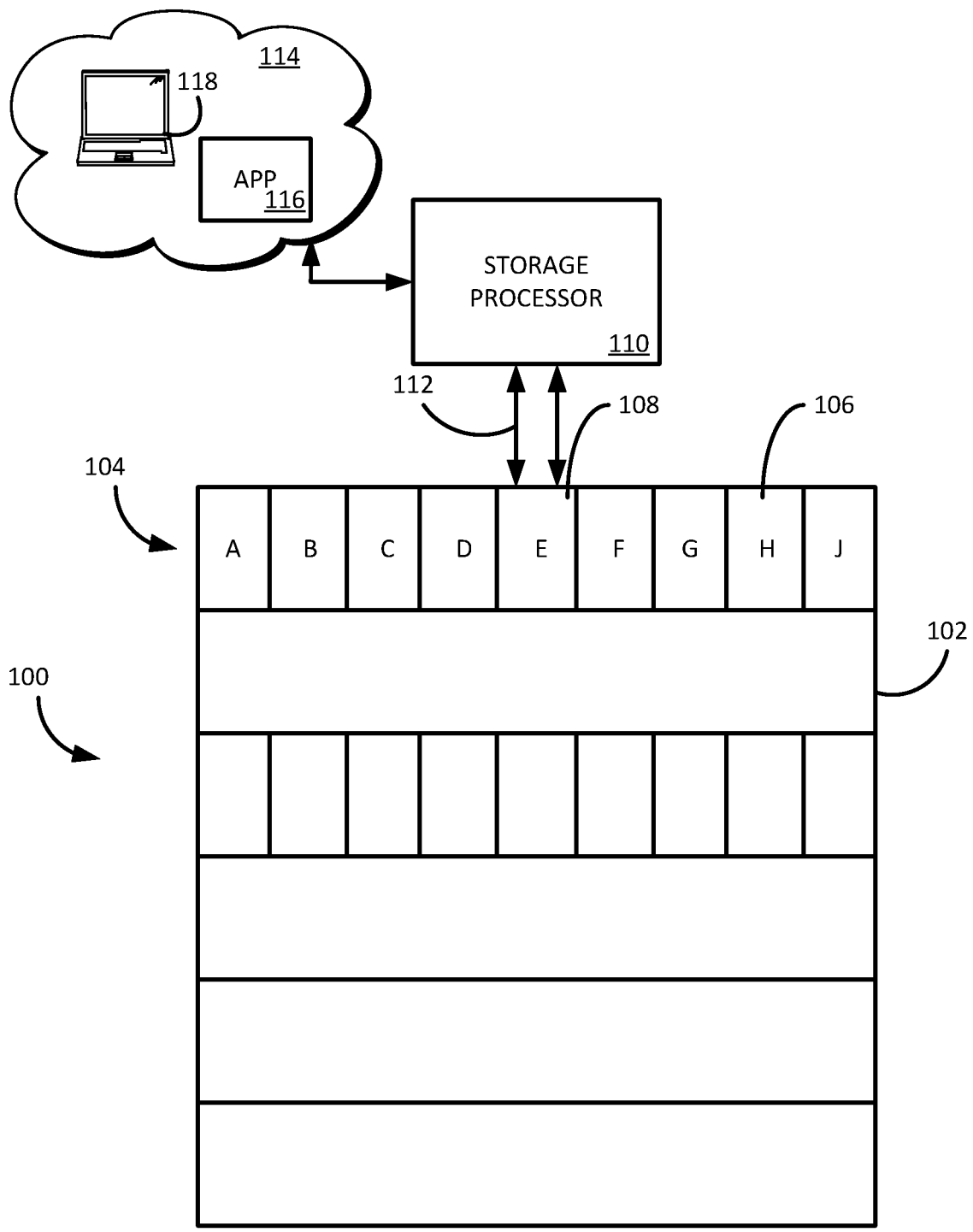
FIG. 1 illustrates an example storage area network (SAN) appliance for use in storing and managing high capacity data.

FIG. 1 illustrates an example storage area network (SAN) appliance 100 for use in storing and managing high capacity data. As explained in more detail below, the SAN appliance 100 allows for high capacity storage of data for compute devices 118 and/or applications 116 in communication with the appliance. Further, the storage devices of the SAN appliance 100 may be gathered into one or more storage pools. In one example, the storage devices 104 of the SAN appliance 100 are pooled together based on performance metrics of the devices and each storage pool of the appliance may be associated with a storage tier based on the performance metrics of the storage devices. The pooling of components of the SAN appliance 100 is discussed in more detail below.

The SAN appliance 100 may include a rack 102 or other housing structure in which one or more storage components 104 may be mounted. In one embodiment, communication between the components 104 of the appliance 100 may occur along a backplane of the rack. Although the appliance 100 illustrated in FIG. 1 only includes components 104 on the top shelf of the rack 102, it should be appreciated that the appliance may include any number of shelves, components, racks, etc. Generally, however, the SAN appliance 100 is limited to hosting storage-type devices, such as disc drives or solid state memory devices. Thus, the storage components 104 of the top shelf of the storage appliance 100 may include any type of storage device. For example, storage device E 108 may be a disc drive memory component while storage device H 106 may be a solid state memory device. Communication between the components (and other components on other shelves) may occur along a communication path of the rack 102.

To provide access to the storage devices 104 of the appliance 100, a storage processor 110 may be in communication with the components of the appliance through a communication path 112. In general, the storage processor 110 configures the one or more storage devices 104 of the appliance 100 to store data utilized by one or more applications or compute devices. Thus, the storage processor 110 is also in communication with a network 114 that includes one or more compute devices 118 and one or more executing applications 116. Although only one compute device 118 and one application 116 is illustrated in FIG. 1, it should be appreciated that the network 114 may include any number of such devices and applications, often located in disparate locations and communicating with the storage processor 110 through a communication network. Further, the application 116 may be executed by the compute device 118, which may utilize the storage capacity of the SAN appliance 100 to store data that is used by the application during execution. In this manner, data is provided to (or requested from) the storage processor 110, which in turn provisions space on one or more of the storage devices 104 of the storage appliance 100 for use in storing the data.

As mentioned above, multiple storage devices 104 of the appliance 100 may be pooled together by the storage processor 110 to provide larger data capacity for the components of the compute network 114. For example, storage component A and storage component B may be logically pooled together by the storage processor 110 such that the two components may operate as a single storage component, thereby providing twice the storage capacity of a single storage component. The combined storage components are then considered a storage pool by the storage processor 110. Often, storage pools include storage components of the same or similar operational parameters or performance metrics. For example, storage device E 108 may be a flash memory storage device that provides relatively fast store and retrieval times, but may have relatively low storage capacity. Storage device E 108 will often be pooled with other flash memory devices of similar performance metrics. Alternatively, storage device H 106 may be a disc drive memory storage device that provides relatively slow store and retrieval times, but may have relatively high storage capacity. Storage device H 106 will then often be pooled with other disc drive memory devices of similar performance metrics.

Pooling similar storage components 104 of the system 100 based on performance metrics allows the storage processor 110 to create a tiered storage system. For example, a first storage tier may be assigned by the storage processor 110 to a first storage pool. The first storage tier may be associated with fast performing devices. A second storage tier, associated with slower performing devices, may be associated with a second storage pool and a third storage tier, associated with slow performing devices but with large capacity, may be associated with a third tier. As should be appreciated, any number of storage tiers may be assigned by the storage processor 110 to any number of storage pools. Further, the criteria defining a storage tier may be any performance criteria of the storage devices in the storage pools. In general, the storage processor 110 creates the storage pools of the storage appliance 100 and assigns one or more storage tiers to the created storage pools. This allows for the storage processor 110 to add more capacity to the various storage pools as more storage devices are added to the appliance 100.

The storage tiers allow the storage processor 110 to accommodate the particular execution parameters of the executing applications 116 and compute devices 118 of the computing network 114. For example, a newly executing application may request storage capacity from the storage appliance 100 and, in some instances, may provide certain storage performance metrics that should be available to the application. The storage processor 110 may, in response to the request, determine which storage tier will provide the appropriate storage performance metrics for the executing application, determine or create a storage pool associated with the selected storage tier, and create capacity within one or more of the storage components 104 of that storage pool for use by the application. In this manner, storage capacity within the SAN appliance 100 is provided to applications 116 or computer devices 118 that correspond to requested storage performance metrics through the use of the storage pools.

Figure 2A:
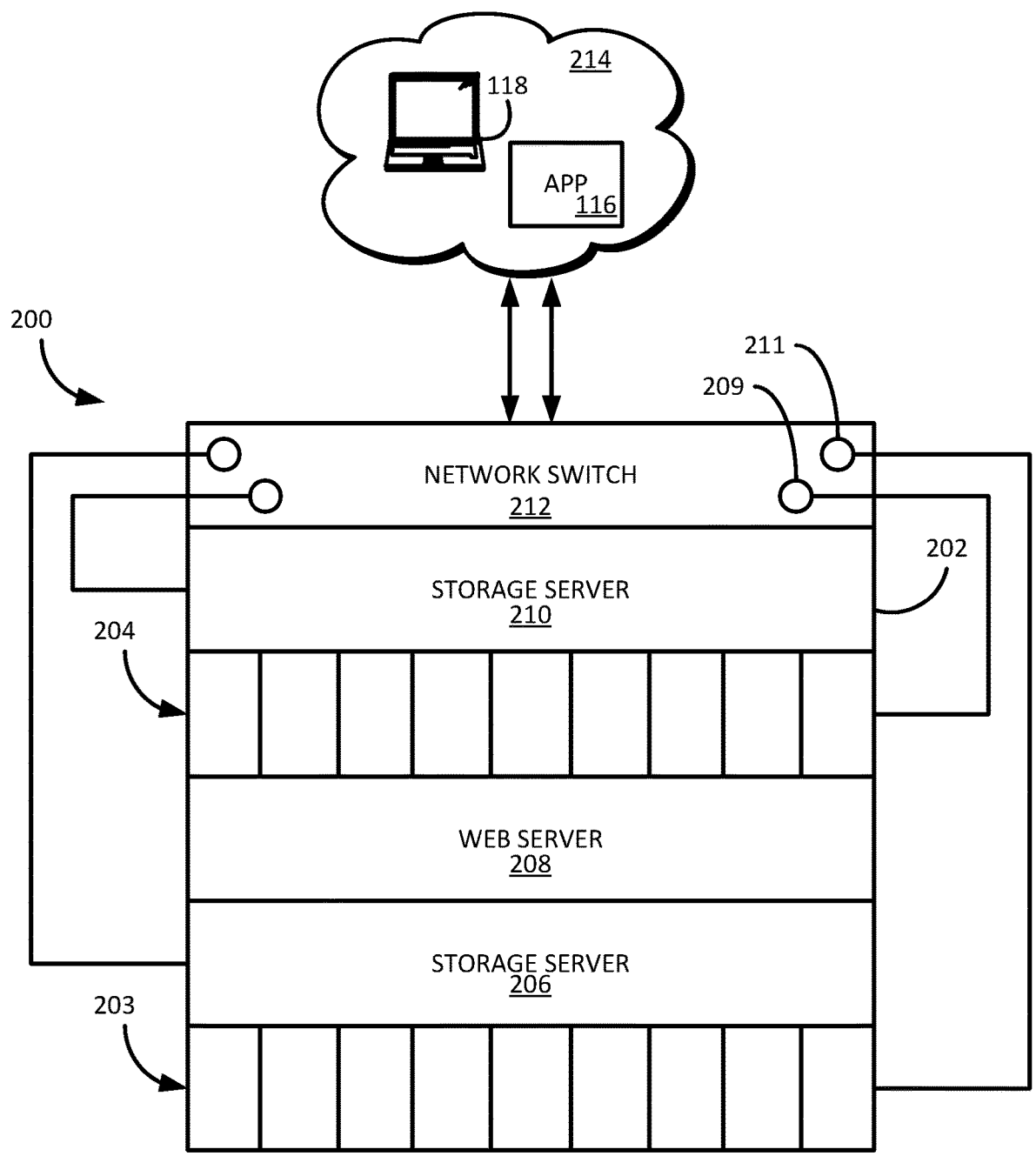
FIG. 2A illustrates an example software defined storage (SDS) appliance for use in storing and managing high capacity data.

FIG. 2A illustrates an example software defined storage (SDS) appliance 200 for use in storing and managing high capacity data. The SDS appliance 200 is similar to that of the SAN appliance 100 discussed above in that the SDS appliance may include a rack 202 in which one or more storage devices 204 may be installed or mounted. A storage server 210 may be in communication (such as through a backplane of the appliance 200) that performs the storage processor operations described above. Thus, the storage server 210 may receive requests for storage capacity from one or more executing applications or compute devices and utilize the storage devices 204 of the appliance 200 to provide said capacity.

One difference between the SAN appliance 100 of FIG. 1 and the SDS appliance 200 of FIG. 2A is that an SAN appliance is typically reserved for storage devices while the SDS appliance may include any rack-mounted device. In other words, the SDS appliance generally only includes storage devices and is a dedicated storage appliance. Alternatively, the SDS appliance 200 of FIG. 2A may be a typical rack of a computing center that includes some storage devices 204, along with other types of rack-mounted devices. Thus, the storage pools created in the SDS storage scheme are virtual or software defined such that the storage devices do not need to be located on the same rack and/or associated with the same storage processor.

Figure 2B:
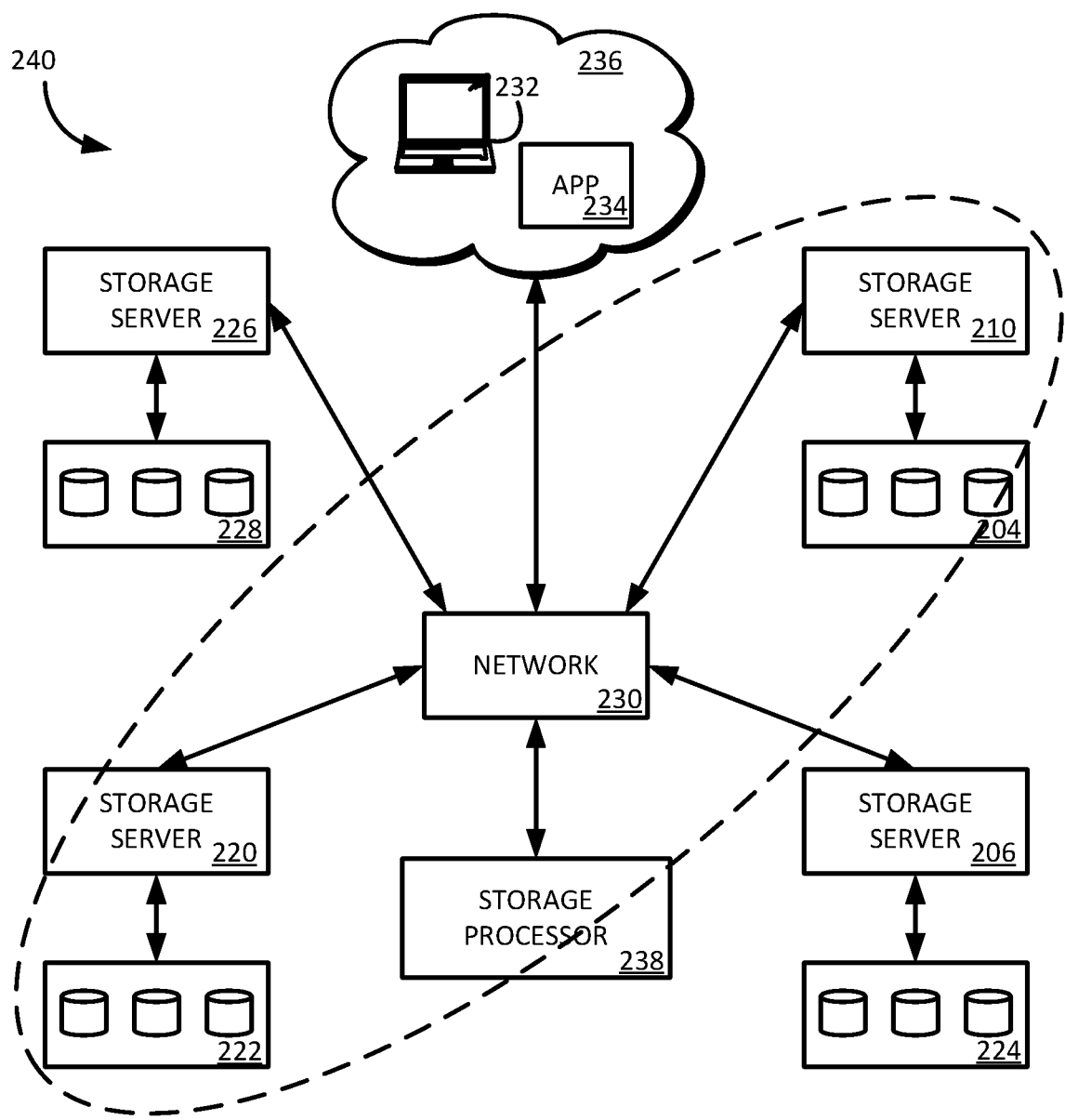
FIG. 2B illustrates a schematic of an application accessing an software defined storage (SDS) for storing and managing high capacity data.

To understand the virtual nature of the SDS storage pools, FIG. 2B illustrates a system schematic of software defined storage (SDS) for use in storing and managing high capacity data. As shown, several groups of storage devices 204, 224, 222, 228 are connected to associated storage servers 210, 219, 220, 226. Each storage device group and storage server pair are interconnected through a network 230 that allows data to be transmitted between the server-storage device pairs. Further, through the network 230, one or more compute devices 232 and/or applications 234 may access the storage devices of the SDS 240. The storage devices may be located in the same rack or may be located in different locations. For example, storage devices 228 may be located in a storage center in Nashville, Tenn. while storage devices 204 may be located in Boston, Mass. Regardless of the location of the storage devices, the associated storage server for each group of storage devices receives data or requests for data from the compute devices or applications through the network 230 and requests the capacity or data from the associated storage devices. In this manner, the remotely located storage devices may be utilized similar to the storage devices of the SAN discussed above, without the need for the storage devices to be in the same rack.

A storage processor 238 similar the storage processor 110 described above may be executed on any device of the network 230 to perform the operations discussed above. Thus, the storage processor 238 of the network 230 may group storage devices of the SDS 240 into pools in a similar manner as described. For example, storage devices 204 (and associated storage server 210) may be grouped with storage devices 222 (and associated storage server 220) into a first storage pool. Also similar to above, the created storage pool may be assigned with a storage tier that is associated with the performance metrics of the storage devices included in the storage pool. In this manner, the storage devices of the SDS 240 system may also be grouped into pools and assigned a storage tier based on performance metrics, regardless of geographical location of the storage devices.

Returning to FIG. 2A, a rack 202 is presented that includes one or more storage components 203, 204 that may be included in an SDS 240 as described above. In other words, the storage components 203, 204 in the illustrated rack 202 may be combined with other, similar storage components (either within the same rack, in the same location, or in a different location) to form a storage pool that may be utilized by an executing application 234 or compute device 232 to store data. Each shelf or group of storage components of the system 200 may be associated with a storage server that operates as a storage processor for the associated storage devices. Thus, storage components 203 may be associated with storage server 206 and storage components 204 may be associated with storage server 210. It should be appreciated that a storage server may be associated with more or fewer storage components as indicated in FIG. 2A. Further, the storage server for any group of storage components may receive requests or instructions from an application or compute device over a network 214 and configure or access one or more storage devices accordingly, as described above in relation to the storage processor 110 of the SAN of FIG. 1.

One advantage of an SDS over previous SAN storage systems is that additional devices not necessarily part of the SDS may be installed in a rack 202 that includes storage devices. For example, the SAN system 100 of FIG. 1 is typically provided as a dedicated storage rack such that all or most of the components installed on the rack belong to the SAN storage system. Alternatively, because the storage devices of an SDS system are virtually grouped into pools and may be located anywhere within a network, it is not necessary that all of the components included in the rack 202 of FIG. 2A belong to a storage system. Rather, other types of devices may be included in the rack. For example, the rack 202 may include one or more compute devices, such as web servers 208 or other types of networking equipment. The compute devices 208 of the rack 202 may be associated with the virtual SDS system, or may perform other functions unrelated to the SDS system of which the storage components 203, 204 are a part. Thus, instructions for utilizing the compute devices 208 of the rack 202 may be received from the network 214 in communication with the rack, similar to the instructions received to configure and interact with the storage components 203, 204 of the rack.

Although an SDS system 202 provides more flexibility in the type of components that may be included in a rack with storage devices 203, 204, other issues may arise when utilizing the rack 202. For example, to communicate with the network 214, the rack 202 may include a network switch 212 or other networking device to receive communications from the network and provide the communication to the intended device. More particularly, the switch 212 provisions communication ports within the switch for the devices in the rack 202 and routes communications according to the provisioned ports. In one embodiment, the switch 212 is located at the top of the rack 202 and all communications between the rack and the network 214 and between components within the rack 202 are transmitted through the switch. However, because the switch 212 must process all communications between the devices of the rack 202 and to/from the network 214, the switch may create a bottleneck effect in the processing speed and performance of the devices of the rack 202. It should be appreciated that, although discussed herein as a physical switch device with physical communication ports, the operations of the switch and the usage of communication ports may be included as a virtual machine or component. Thus, any assignment of components to a switch or ports of the switch may occur virtually such that physical ports may be shared among many components. For ease of understanding, however, the ports of the switch are discussed herein as being assigned to a component as a physical port, although each discussed port may be virtual in nature.

Figure 2C:
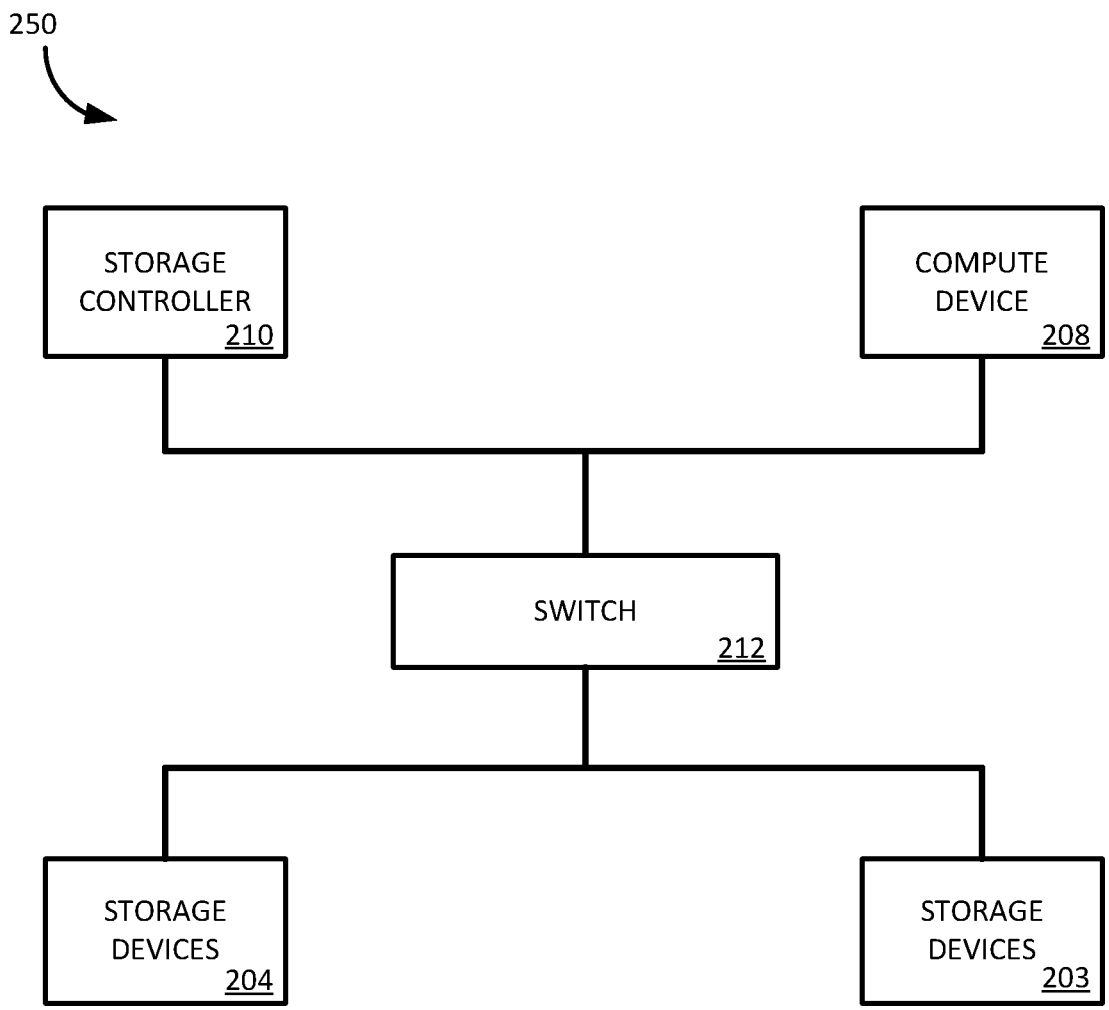
FIG. 2C is an illustration of a network flow of a SDS system.

For example, FIG. 2C is an illustration of a network flow of a rack 202 that includes one or more storage devices 203, 204 that form a portion of the SDS system. As shown, the network flow illustration 250 includes the devices of the rack 202 discussed above, namely the switch 212, a first group of storage devices 203 (potentially grouped into a first storage pool), a second group of storage devices 204 (potentially grouped into a second storage pool), a storage server or controller 210, and a compute device 208, such as a web server. It should be appreciated that more or fewer components of the rack 202 may be included in the network flow diagram 250 of FIG. 2C. As discussed, each component transmits data utilizing the switch 212 to interact with another component of the network or with an executing application. In particular, the compute device 208, executing an application, may communicate with the storage controller 210 to provide data for storing or request data from storage. The storage controller 210 may communicate with one or both group of storage devices 203, 204 to store data or retrieve stored data. The controller 210 may determine which storage devices are accessed based on a storage tier assigned to each storage pool. Further, the storage devices 203, 204 may communicate with each other to rebuild data and/or rebalance data between the devices, either within the same storage pool or between the different storage pools. Further still, any one of the components of the system 250 may communicate out to a network 214 through the switch 212 to interact with other components or applications. In any event, all of the communications of the system 250 are transmitted through the switch 212.

In some instances, providing all communications through a single switch 212 may negate intended or promised performance metrics for one or more of the tiers associated with the storage devices 203, 204 of the SDS. For example, a first storage tier may be applied to storage devices 203 such that applications accessing the storage devices require or intend to receive fast transmission and storing of data in the devices. However, because the switch 212 processes such requests in addition to requests to storage devices 204 (which may be of a lower storage tier) and instructions to and from the web server 208, the switch may not be able to process the accessing of the tier one storage devices at the intended speed or performance. In this manner, a bottleneck in the performance of the devices of the rack 202 may occur at the switch 212 tasked with processing communications between the devices and the network 214.

Figure 3:
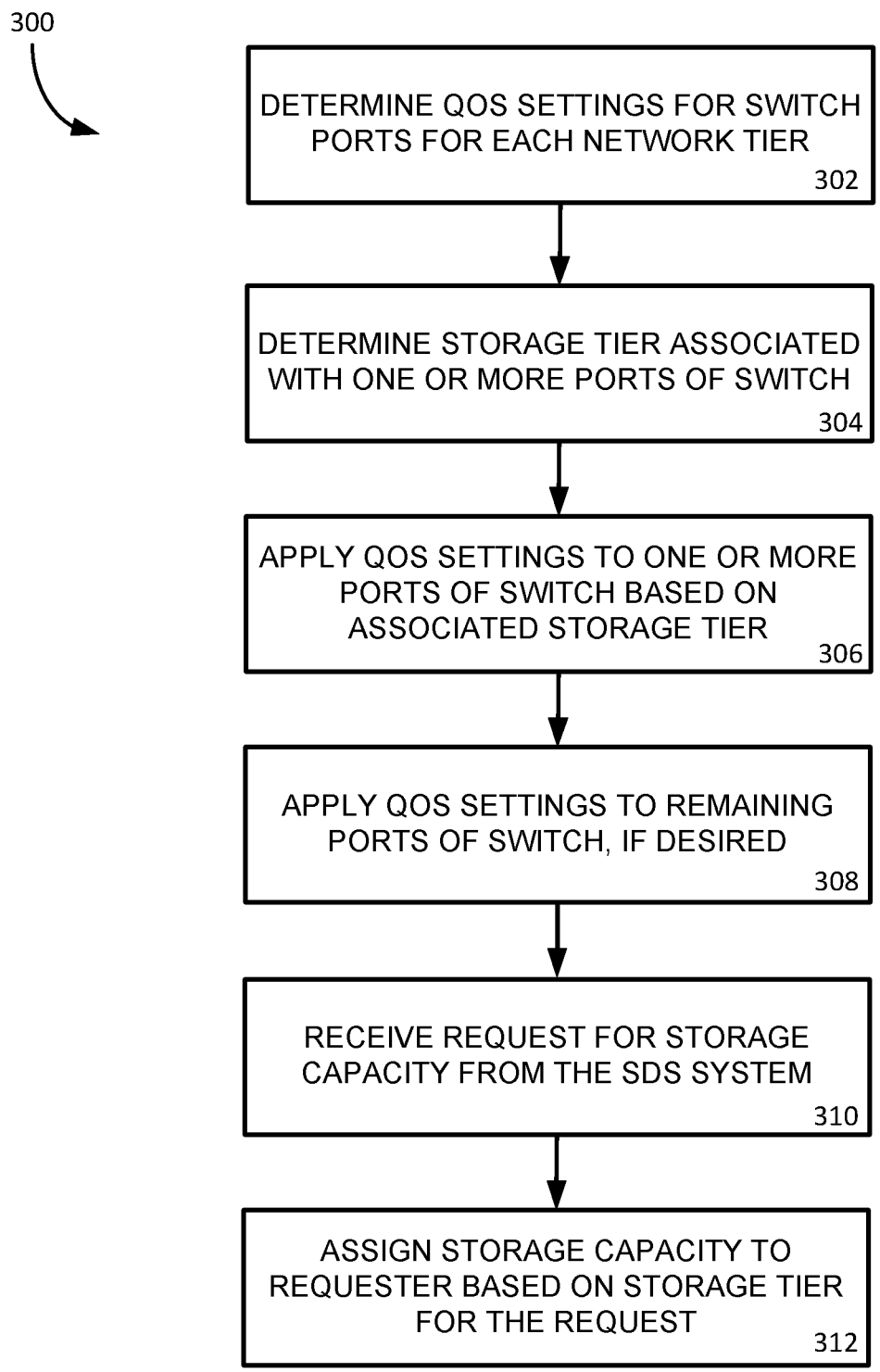
FIG. 3 is a flowchart of a method for providing tiered network settings for a SDS appliance.

To address this potential performance issue, systems and methods are described herein to apply a tiered scheme of quality of service settings for the ports of a network switch 212 of the rack 202 based at least on a performance metric of a storage pool of a software defined storage (SDS) appliance 200. In particular, FIG. 3 is a flowchart of a method 300 for providing tiered network settings for a SDS appliance to address potential bottlenecks at the switch for a particular rack 202 that houses one or more storage devices 203, 204. In one embodiment, the operations of the method 300 may be performed by a network administrating system or program to configure the components of the network switch 212 of the SDS system 200. For example, a storage configuration system or management program associated with the SDS system tasked with creating the one or more storage pools of the storage devices included in the SDS system may also perform one or more of the operations described below. In another embodiment, the operations may be performed by a network administrator or management system to configure the switch 212 of any storage system 200 included in an SDS scheme.

Beginning in operation 302, the storage system determines one or more quality of service settings for ports of a network switch for each of the storage tiers of the SDS. In general, quality of service (QoS) settings for a network device provide guaranteed performance metrics for processing of communications through the ports of the device. For example, QoS settings for a network port may include a particular bandwidth for data packet flow through the port, a priority associated with the processing of data packets from multiple sources, and/or a relative queue size for data packets awaiting transmission through the port. These examples and other QoS settings provide for a performance speed for a particular port in the processing and transmitting of received data packets, as now discussed with reference to the table 400 of FIG. 4.

FIG. 4 is a table 400 illustrating example tiered settings for a switch or other network device associated with a SDS appliance. In particular, the table 400 illustrates three different networking tiers 402-406 and the particular QoS settings associated with each tier. It should be appreciated that each networking tier 402-406 may include any number or type of QoS settings supported by the networking device that determines a processing and transmitting performance of a received data packet. The QoS settings included in the table 400 are but a few examples of the many and varied settings that may be applied to each networking tier 402-406. Further, the table 400 of available network tiers 402-406 for a SDS system may include fewer or more tiers than shown. In general, a SDS system or management tool may apply the one or more networking tiers to ports of a switch 212 of an SDS system 200 to ensure a particular level of performance for communications through the ports of the network switch.

As shown in table 400, a first tier 402 (referred to as "policy A") includes three QoS settings, namely an ensured data transmission bandwidth 408 for a port of the device, a priority 410 applied to data packets transmitted through the port, and a relative queue size 412 of data packets awaiting to be processed through the port. The bandwidth QoS setting 408 establishes a lower limit on a bandwidth of data packet flow through the particular port configured with the QoS setting. For example, the network switch 212 may be capable of processing up to 10 Mbps of data through any one port of the switch. However, the switch 212 may not provide the full 10 Mbps to all of the ports at one time such that, based on the number of data packets received at the switch, the bandwidth of each port may be less than 10 Mbps. The QoS bandwidth setting 408 for the network tiers, on the other hand, may ensure a lower limit to the processing bandwidth for the ports assigned to the network tier. For example, network policy A 402 provides for a 50% lower limit on the available bandwidth for the port. In the above example, this QoS setting ensures that data processing at the port will occur at least at 5 Mbps when the network switch 212 is processing a large number of data packets at once. Similarly, the bandwidth QoS setting 408 for network policy B 404 provides for at least a 2.5 Mbps data processing and the bandwidth QoS setting for network policy C 406 provides for at least a 1.5 Mbps data processing. It should be appreciated, however, that the networking tiers may include any bandwidth QoS setting as desired by the system 200.

In addition to the bandwidth QoS setting, each network tier 402-406 may include a priority QoS setting 410. The priority QoS setting 410 applies to data packets received at the port and transmitted through the port to another component of the system 200 or network 214. The priority establishes an order in which received data packets are processed at the receiving port. Thus, in the example of FIG. 4, network tier A 402 provides a high priority (level 3 priority), network tier B 404 provides a lower priority than the high priority (level 2 priority), and network tier C 406 provides a low priority (level 1 priority). Thus, packets intended for or from a component associated with a port within network tier A 402 receive a high priority label 410 when processed through the port. Similar to the bandwidth QoS setting, the networking tiers 402-406 may include any priority QoS setting as desired by the system 200.

Yet another example of a QoS setting is a queue size 412. The queue size 412 indicates a general length or size to a queue of data packets to be transmitted through a particular port of the switch 212. In general, when the queue is full, the port of the switch 212 may refuse to receive new data packets until some data packets have been transmitted through the port. The port may, in such circumstances, drop the received data packet such that a sending device or port must retransmit the data packet. Thus, a larger queue size QoS setting 412 indicates that the port will hold more data packets in the queue than ports with smaller queue size. As shown in the table 400, a relatively large queue size 412 may be assigned to a first networking tier 402, a medium queue size 412 may be assigned to a second networking tier 404, and a small queue size 412 may be assigned to a third networking tier 406. However, the networking tiers 402-406 may have any queue length 412 associated with the tier. Further, it is not necessary that each tier 402-406 include a separate or distinct queue length QoS setting 412. Rather, two or more networking tiers 402-406 may have the same queue length QoS setting 412 (or any other type of QoS setting 408, 410) as desired by the system 200.

Through the various QoS settings 408-412 of the switch 212, a SDS system 200 may tune or set different performance parameters for the ports of the switch. In the particular example illustrated in the table 400, ports assigned with the QoS settings 408-412 of networking tier A 402 would have relatively high performance metrics, while ports assigned with the QoS settings of networking tier C 406 would have relatively low performance metrics. Returning to the method 300 of FIG. 3, the SDS system determines which particular QoS settings of the switch 212 correspond with the particular network tier of the switch. In other words, the SDS system determines which the QoS settings in the table 400 of FIG. 4 for the different networking tiers 402-406. As explained above, the various QoS settings of the networking tiers 402-406 may provide various performance metrics for the ports of the networking device 212.

In operation 304, the SDS system determines a storage pool associated with one or more of the communication ports of the switch 212. For example, as mentioned above the rack 202 may include one or more storage devices 203, 204. These storage devices 203, 204 may be a part of a storage pool of a SDS system. Further, each of the storage devices 203, 204 of the rack 202 may be associated with and utilize a communication port of the network switch 212. For example, a first storage device from shelf 204 may utilize a first communication port 209 of the switch 212, a second storage device from shelf 203 may utilize a second communication port 211 of the switch. Further still, the first storage device 204 may be associated with a first storage pool of the SDS system while the second storage device 203 is associated with a second storage pool. Each storage pool may include different performance metrics (described above as a storage tier) based on the capabilities of the storage devices within the storage pool. Thus, as communication port 209 is utilized by the first storage device 204 with a first storage tier, the SDS system may associate the first storage tier with the first communication port 209. Similarly, a second communication port 211 may be associated with a second storage tier as a storage device 203 belonging to the second storage tier utilizes the second communication port. In this manner, the ports of the switch 212 that are utilized by storage devices 203, 204 of the SDS system 200 that belong to a storage tier may be also associated with those storage tiers.

In operation 306, the SDS system 200 (such as a management tool or other component of the system) applies the QoS settings from the networking tiers to the ports of the network switch based on the associated storage tier determined above. For example, a communication port 209 of the switch 212 is associated with a storage tier (based on the type of storage device 204 utilizing the port), as explained above. However, as also explained above, the communication port may slow down the performance of the storage device such that the performance metrics of the storage device 204 are not met due to bottlenecking of data packets at the port. In response, a networking tier (and associated one or more QoS settings for the port) may be assigned to the port by the management tool to aid in the storage device meeting the storage tier performance metrics. For example, port 209 may be associated with a high performing storage tier and storage device 204. A similarly high performing networking tier, such as network policy A 402 illustrated in table 400, may be applied to port 209 to aid the high performance of data between the storage device 204 and an executing application through the port. Other ports associated with other storage tiers may be assigned other network tier policies, such as network tier B 404 for lower performing storage tiers and network tier C for the lowest performing storage tiers. In general, the networking tiers are configured to provide a level of performance for a particular port that matches or tracks with the performance metrics of the associated storage tier for the port. However, the management tool may apply any network tier to any port as desired based on an associated storage tier of the port.

The application of the QoS settings to the ports of the switch 212 may occur through the management tool providing one or more configuration instructions to the switch to configure the QoS settings for the ports. For example, the switch 212 may receive one or more configuration instructions from the management tool to apply the QoS settings from network tier A 402 to communication port 209 based on that port being associated with a first storage tier. Similar instructions may be provided to the switch for the other ports of the switch to apply the QoS settings for the network tiers 402-406 to the various ports of the switch. In addition, not all of the ports of the switch 212 may be associated with a storage tier. For example, SDS system 200 includes a compute device, namely web server 208. Web server 208 may or may not utilize the storage devices 203, 204 of the SDS system. Regardless, the web server 208 may utilize one or more ports of the switch 212 to communicate with other components of the system, or to communicate with components or applications through the connected network 214 such that traffic data to/from the compute device may further degrade the performance of the switch, negatively affecting the data transfer for the storage devices of the system. As the compute device 208 may not be assigned a storage tier as part of the SDS system, a network tier 402-406 may not be applied to the port of the web server 208 based on a storage tier. Thus, in operation 308, the management tool may apply one or more QoS settings to those ports of the switch 212 utilized by the compute devices (or any other device not assigned to a storage tier). The QoS settings for the compute device 308 may include any QoS settings, including a default set of QoS settings applied to ports of the switch 212 that are not otherwise configured through the one or more configuration instructions.

In operation 310, the storage management tool receives a request from an executing application or device for storage capacity in the SDS system. The request may include a particular storage tier required or desired for the storage capacity, including processing speed and size of storage needed for the application or device. In operation 312, the management tool may then assign the requested storage capacity to the application or device based on the requested storage tier for the data. Further, because the communication port of the switch 212 is also assigned a network tier 402-406 similar to the storage tier of the port, the data packets to and from the application or device may meet the storage tier performance metrics without bottlenecking at the port. In this manner, the ports of the switch 212 allow for the passage of data within the SDS system 200 at the necessary performance metrics of the various storage tiers of the SDS system.

Although discussed above as applying a network tier to a port of the switch, it should be appreciated that network tiering is not necessarily limited to assigning to a physical port. For example, in some instances a single storage device may serve requests for multiple storage tiers. Thus, the same storage device may receive storage requests for a first storage tier and requests for a second storage tier. Because a physical port of the switch is utilized by the storage device, both storage tier types are received at the storage device through a single communication port. In such storage configurations, the traffic or communication packets received at the communication port may be classified based on characteristics of the packets themselves. For example, the SDS may perform a deep packet inspection of the received packet to determine the type of packet and associate the packet with a particular storage tier. Such deep packet inspection may determine the performance requirements for the communication, such as a payload of the packet, applications or services the packet is associated with, the amount of processing power associated with the packet, and the like. With this information, the SDS may associate the packet with a storage tier, similar to assigning a storage tier to a particular port described above. With the storage tier assigned to the packet, a networking tier may also be applied with the related QoS settings of the tier as described. In another example, a virtual local area network (VLAN) tag associated with the received communication may be utilized to determine a storage tier of the received communication. Similar to the deep packet inspection, the storage tier associated with the VLAN tag of the communication may then be utilized to provide a network tier and QoS settings for transmitting the communication through the networking device.

Further, although discussed herein for a network switch 212 within a rack 202 containing storage devices 203, 204, it should be appreciated that the above systems and methods may be applied to any networking device. For example, a switch within the network 214 may also be configured to apply the QoS settings for a particular network tier based on a storage tier for a storage device. In this manner, the entire transmission path between an executing application or device and a storage device may have ports configured with particular QoS settings of a network tier based on a requested or assigned storage tier of the storage device. The applied network tier may prevent bottlenecking of the transmission data through any component utilized to transmit the data.

Figure 5:
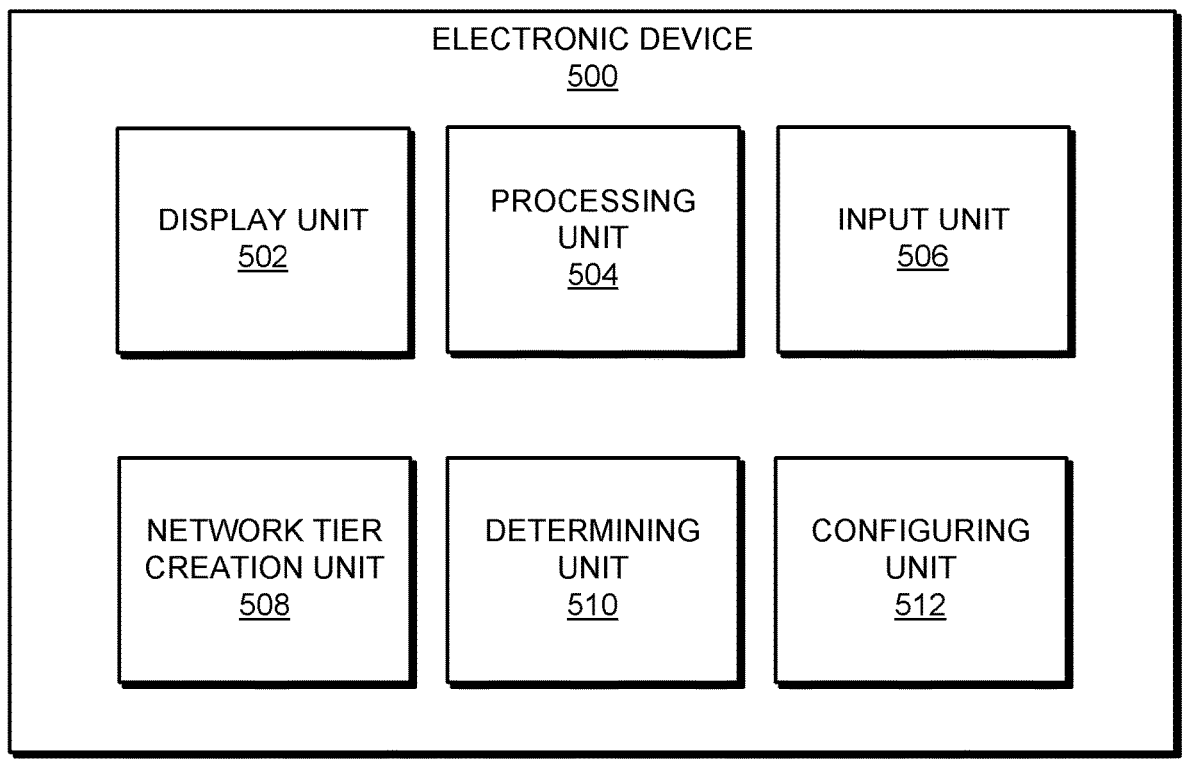
FIG. 5 is a functional block diagram of an electronic device including operational units arranged to perform various operations of the presently disclosed technology.

Turning to FIG. 5, an example electronic device 500 including operational units 502-512 arranged to perform various operations of the presently disclosed technology is shown. The operational units 502-512 of the device 500 are implemented by hardware or a combination of hardware and software to carry out the principles of the present disclosure. It will be understood by persons of skill in the art that the operational units 502-512 described in FIG. 5 may be combined or separated into sub-blocks to implement the principles of the present disclosure. Therefore, the description herein supports any possible combination or separation or further definition of the operational units 502-512.

In one implementation, the electronic device 500 includes a display unit 502 configured to display information, such as a graphical user interface, and a processing unit 504 in communication with the display unit 502 and an input unit 506 configured to receive data from one or more input devices or systems. Various operations described herein may be implemented by the processing unit 504 using data received by the input unit 506 to output information for display using the display unit 502.

Additionally, in one implementation, the electronic device 500 includes units implementing the operations described with respect to FIG. 3. For example, a network tier creation unit 508 may determine the QoS settings that are associated with each of the network tiers of the system. Another unit, such as determining unit 510 may determine which ports of a switch or other networking device are associated with a storage tier and thereby associated with a storage device of the SDS system. Further, a configuring unit 512 of the device 500 may generate and transmit one or more configuration instructions to the switch to configure the ports according to the QoS settings of the network tiers. Additional units may also be included in the electronic device 500 such that the units illustrated are but a sample of possible units included in the device.

Figure 6:
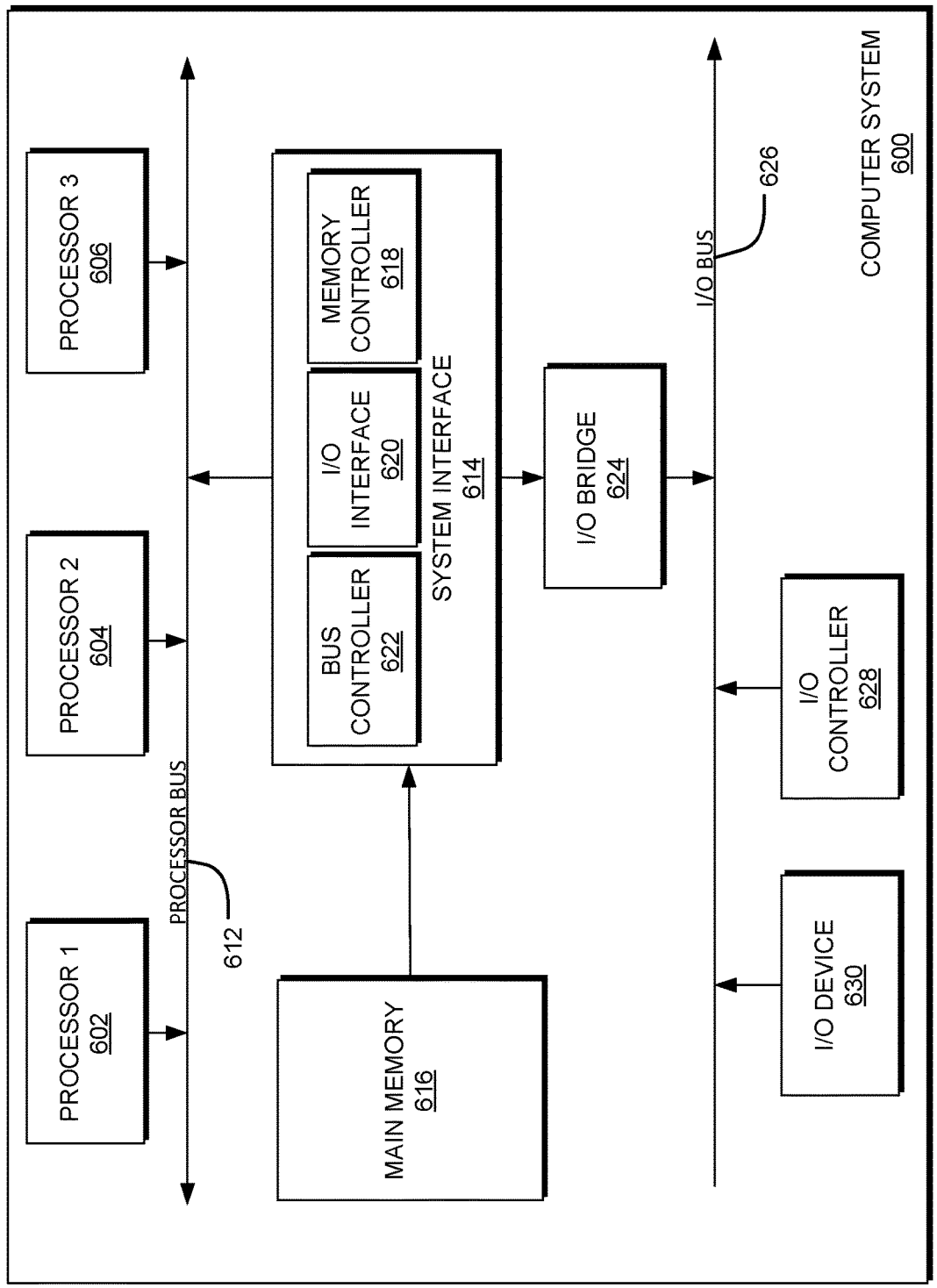
FIG. 6 shows an example computing system that may implement various systems and methods discussed herein, according to one implementation.

FIG. 6 is a block diagram illustrating an example of a computing device or computer system 600 which may be used in implementing the embodiments of the SDS system 200 disclosed above. For example, the computing system 600 of FIG. 6 may be used to implement the storage controller discussed above to apply the one or more networking tiers to the ports of a networking device. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 614 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 640, as illustrated.

I/O device 640 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a computer-readable storage medium having stored thereon instructions, which may be used to program a computer system (or other electronic devices) to perform a process according to the present disclosure. A computer-readable storage medium includes any mechanism for storing information in a form (e.g., software, processing application) readable by a computer, as described above with reference to FIG. 6.

The description above includes example systems, methods, techniques, instruction sequences, and/or computer program products that embody techniques of the present disclosure. However, it is understood that the described disclosure may be practiced without these specific details.

While the present disclosure has been described with reference to various implementations, it will be understood that these implementations are illustrative and that the scope of the disclosure is not limited to them. Many variations, modifications, additions, and improvements are possible. More generally, implementations in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A method for operating a software defined storage (SDS) system, the method comprising:

associating a first communication packet received at a first port of a network switch with a first storage tier of a storage system in communication with the network switch, the storage system comprising a plurality of storage tiers, and the first storage tier comprising a plurality of storage devices operating within a first storage performance parameter;

selecting, based on the first communication being associated with the first storage tier, a first network transmission quality of service (QoS) parameter comprising a first threshold value of a performance metric for processing communications through the first port of the network switch, the first network transmission QoS parameter different than the first storage performance parameter;

generating, based on the selection of the first network transmission QoS parameter for the first port of the network switch, one or more configuration instructions for configuring the network switch, the one or more configuration instructions causing the network switch to apply the first network transmission QoS parameter to the first communication port; and transmitting the one or more configuration instructions to the network switch to configure the network switch.

2. The method of claim 1 wherein the first storage tier corresponds to a first storage device utilizing the first communication port of the network switch to transmit data, the first communication packet intended for the first storage device.

3. The method of claim 2 further comprising:
associating at least a second communication packet, received at a second port of the network switch, with a second storage tier, the second storage tier corresponding to a second storage device different the first storage device; and
applying a second network transmission QoS parameter to the second port, the second network transmission QoS parameter comprising a second threshold value of the performance metric for processing communications through the second port of the network switch.

4. The method of claim 3 wherein the second threshold value of the performance metric for the first network transmission QoS parameter for processing communications through the network switch is less than the first threshold value for the first network transmission QoS parameter for processing communications through the network switch.

5. The method of claim 3 wherein the first threshold value for the first network transmission QoS parameter provides a faster transmission of data through the network switch than the second threshold value for the first network transmission QoS parameter.

6. The method of claim 2 wherein the network switch executes the one or more configuration instructions to apply the first network transmission QoS parameter to the first communication port of the network switch.

7. The method of claim 1 wherein the first network transmission QoS parameter for processing communications through the network switch comprises a lower bandwidth threshold for data transfer through the network switch.

8. The method of claim 1 wherein the first network transmission QoS parameter for transmitting the packet through the network switch comprises a priority value for data transfer through the network switch.

9. The method of claim 1 wherein the at least one QoS parameter for processing communications through the network switch comprises a queue size value for received data packets at the network switch.

10. A management tool of a software defined storage (SDS) system comprising:
at least one communication port for receiving, from an executing application, a request for a storage capacity within the SDS system;
a processing device; and
a computer-readable medium connected to the processing device configured to store information and instructions that, when executed by the processing device, performs the operations of:
creating a plurality of network performance tiers for communication ports of a network device, each of the plurality of network performance tiers comprising a threshold value for at least one quality of service (QoS) parameter for transmitting communications via one or more of the communication ports of the network device;
determining a first subset of the communication ports of the network device utilized by a first type of storage device of the SDS system in communication with the network device to transmit data;
associating a first storage tier corresponding to the first type of storage device of the SDS system with the first subset of the communication ports of the network device, the first storage tier comprising a first storage performance parameter different than the at least one QoS parameter for transmitting communications via the one or more of the communication ports;
applying, based on the first storage tier associated with the first subset of the communication ports, a first network performance tier of the plurality of network performance tiers to the first subset of the communication ports of the network device, the first network performance tier comprising a first threshold value for the at least one QoS parameter for transmitting communications via one or more of the communication ports of the network device; and
transmitting, to the network device, one or more configuration instructions to configure the first subset of the communication ports to apply the first threshold value for the at least one QoS parameter for transmitting communications via the first subset of the communication ports.

11. The management tool of claim 10 wherein the instructions further cause the processing device to perform the operations of:
determining a second subset of the communication ports, different from the first subset of the communication ports of the network device, are utilized by a second type of storage device of the SDS system;
associating a second storage tier corresponding to the second type of storage device of the SDS system with the second subset of the communication ports; and
applying, based on the second storage tier utilized by the second type of storage device, a second network performance tier of the plurality of network performance tiers to the second subset of the communication ports, the second network performance tier comprising a second threshold value for the at least one QoS parameter for transmitting communications via one or more of the communication ports of the network device.

12. The management tool of claim 11 wherein the second threshold value for the at least one QoS parameter for transmitting communications via one or more of the communication ports of the network device is less than the first threshold value for the at least one QoS parameter.

13. The management tool of claim 11 wherein the first threshold value for the at least one QoS parameter of the first network tier provides a higher transmission rate of data through the first subset of the communication ports of the network device than the second threshold value for the at least one QoS parameter of the second network tier provides for a transmission rate of data through the second subset of the communication ports of the network device.

14. The management tool of claim 10 wherein the at least one QoS parameter for transmitting communications via one or more of the communication ports of the network device comprises a lower bandwidth threshold for a data transfer rate through the first subset of the communication ports of the network device.

15. The management tool of claim 10 wherein the at least one QoS parameter for transmitting communications via one or more of the communication ports of the network device comprises a priority value for data transfer through the first subset of the communication ports of the network device.

16. The management tool of claim 10 wherein the at least one QoS parameter for transmitting communications via one or more of the communication ports of the network device comprises a queue size value for received data packets at the first subset of the communication ports of the network device.

17. A non-transitory computer-readable medium encoded with instructions, executable by a processing device, for operating a component of a storage system, the instructions, when executed by a processing device, cause the processing device to perform the operations of:
associating one or more ports of a network switch with a first storage tier, the first storage tier corresponding to a first storage device type of an software defined storage (SDS) system in communication with the network switch and utilizing the one or more ports of the network switch to transmit data, the first storage tier comprising a plurality of storage devices of the first storage device type operating within a first storage performance parameter;
selecting, based on the first storage tier associated with the one or more ports, a first network transmission quality of service (QoS) parameter comprising a first threshold value of a performance metric for processing communications through the one or more ports of of the network switch, the first network transmission QoS parameter different than the first storage performance parameter; and
configuring the one or more ports of the network switch through at least one configuration instruction for the network switch, the at least one configuration instruction causing the network switch to apply the first network transmission QoS parameter for the one or more ports of the network switch.

18. The non-transitory computer-readable medium of claim 17 wherein the first network transmission QoS parameter for the one or more ports of the network switch comprises a lower bandwidth threshold for data transfer through the one or more ports.

19. The non-transitory computer-readable medium of claim 17 wherein the first network transmission QoS parameter for the one or more ports of the network switch comprises a priority value for data transfer through the one or more ports.

20. The non-transitory computer-readable medium of claim 17 wherein the first network transmission QoS parameter for the one or more ports of the network switch comprises a queue size value for received data packets at the one or more ports.

\* \* \* \* \*